(12) United States Patent
Vanden Bussche

(10) Patent No.: US 7,442,350 B1
(45) Date of Patent: *Oct. 28, 2008

(54) PLATE DESIGN FOR MIXER SPARGER

(75) Inventor: Kurt M. Vanden Bussche, Lake in the Hills, IL (US)

(73) Assignee: UOP LLC, Des Plaines, IL (US)

( * ) Notice: Subject to any disclaimer, the term of this patent is extended or adjusted under 35 U.S.C. 154(b) by 814 days.

This patent is subject to a terminal disclaimer.

(21) Appl. No.: 10/837,773

(22) Filed: May 3, 2004

Related U.S. Application Data

(63) Continuation-in-part of application No. 10/418,589, filed on Apr. 17, 2003, now Pat. No. 7,192,562.

(51) Int. Cl.
*B01F 5/06* (2006.01)
*B01J 19/24* (2006.01)

(52) U.S. Cl. .................. 422/224; 366/341; 239/398; 239/433

(58) Field of Classification Search ............. 366/341, 366/DIG. 1, DIG. 2, DIG. 3
See application file for complete search history.

(56) References Cited

U.S. PATENT DOCUMENTS

| 4,336,240 | A | | 6/1982 | Moseley et al. ............. 423/584 |
|---|---|---|---|---|
| 4,347,231 | A | | 8/1982 | Michaelson ................. 423/584 |
| 4,832,938 | A | | 5/1989 | Gosser et al. ............... 423/584 |
| 5,595,712 | A | * | 1/1997 | Harbster et al. ............ 422/129 |
| 5,925,588 | A | | 7/1999 | Chuang et al. ............. 502/181 |
| 6,042,804 | A | | 3/2000 | Huckins ...................... 423/584 |
| 7,192,562 | B1 | * | 3/2007 | Towler et al. ............... 422/211 |

* cited by examiner

*Primary Examiner*—Jennifer A Leung
(74) *Attorney, Agent, or Firm*—Arthur E Gooding

(57) ABSTRACT

An apparatus is disclosed for the generation of hydrogen peroxide. The apparatus is designed to allow for a greater range of tolerances in its manufacture. The apparatus provides for the production of a large scale volume of hydrogen peroxide by the generation of a liquid bearing bubble cloud. The bubbles are generated with a tiny volume before flowing over the reactor bed to generate the hydrogen peroxide.

8 Claims, 4 Drawing Sheets

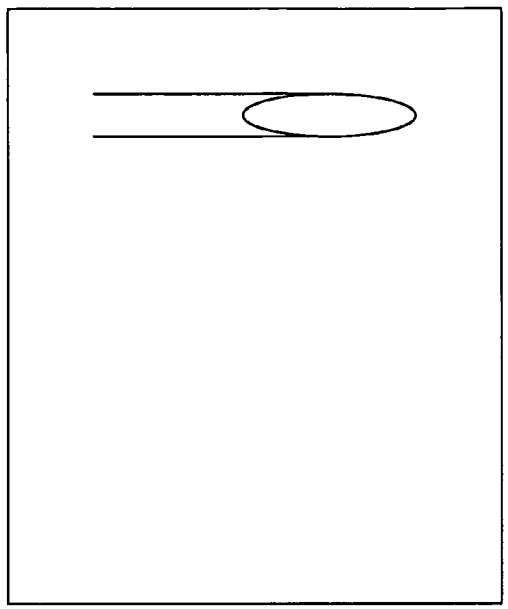
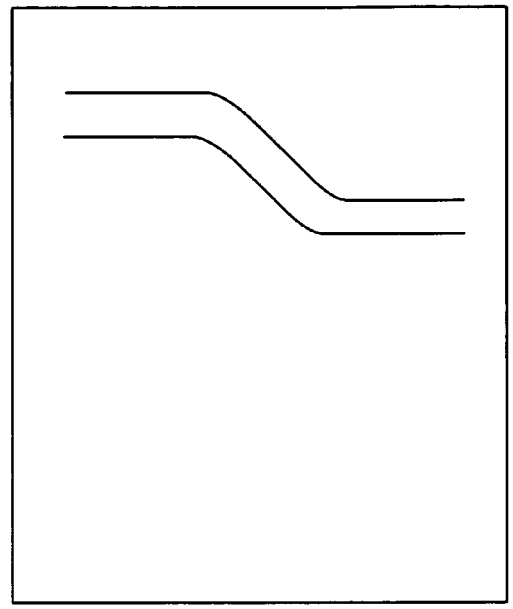
FIG. 3a                                    FIG. 3b
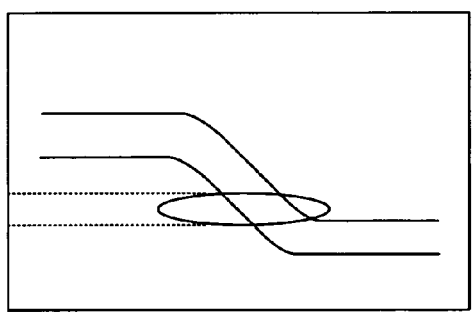
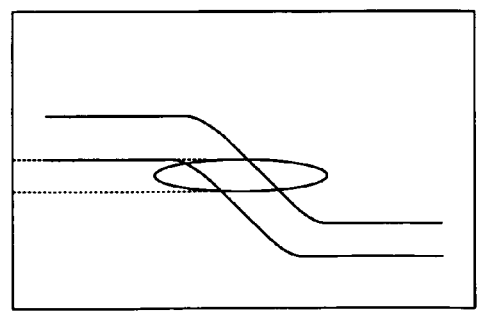
FIG. 3c                                    FIG. 3d

PLATE DESIGN FOR MIXER SPARGER

CROSS-REFERENCE TO RELATED APPLICATION

This application is a continuation-in-part of application Ser. No. 10/418,589 now U.S. Pat. No. 7,192,562, filed Apr. 17, 2003, and which is incorporated by reference in its entirety.

FIELD OF THE INVENTION

The field of the invention is a gas mixing apparatus. In particular, this invention relates to the mixing of gases with compositions that can result in combustible mixtures.

BACKGROUND OF THE INVENTION

Currently the most widely practiced industrial scale production method for hydrogen peroxide is an indirect reaction of hydrogen and oxygen employing alkylanthraquinone as the working material. In a first catalytic hydrogenation step, the alkylanthraquinone, dissolved in a working solution comprising organic solvents (e.g. di-isobutylcarbinol and methyl naphthalene), is converted to alkylanthrahydroquinone. In a separate autooxidation step, this reduced compound is oxidized to regenerate the alkylanthraquinone and yield hydrogen peroxide. Subsequent separation by aqueous extraction, refining, and concentration operations are then employed to give a merchant grade product.

Overall, this indirect route to $H_2O_2$ formation, whereby a carrier medium is reduced and then oxidized, adds complexity and requires high installation and operating costs. One notable drawback is the significant solubility of the alkylanthraquinone in the aqueous extraction medium used to separate the hydrogen peroxide product. This promotes loss of working solution and leads to contamination of the hydrogen peroxide product with organic species that, when the hydrogen peroxide is concentrated to levels suitable for transport, are reactive with it. A second problem relates to the solubility of the aqueous extraction solution in the alkylanthraquinone working solution. When wet working solution is separated from the aqueous phase for recycle to the indirect oxidation stage, residual aqueous phase "pockets" within the organic solution provide regions for hydrogen peroxide product to concentrate to the extent of becoming hazardous. A third problem relates to the usage and recovery of an organic compound when small amounts of hydrogen peroxide are needed without the organic contamination in an aqueous stream.

Considerably more simple and economical than the alkylanthraquinone route is the direct synthesis of hydrogen peroxide from gaseous hydrogen and oxygen feed streams. This process is disclosed in U.S. Pat. No. 4,832,938 B1 and other references, but attempts at commercialization have led to industrial accidents resulting from the inherent explosion hazards of this process. Namely, explosive concentrations of hydrogen in an oxygen-hydrogen gaseous mixture at normal temperature and pressure are from 4.7-93.9% by volume. Thus the range is extremely broad.

It is also known that dilution of the gaseous mixture with an inert gas like nitrogen scarcely changes the lower limit concentrations, on an inert gas-free basis, of the two gases. Within normal ranges of pressure variation (1-200 atmospheres) and temperature variation (0-100° C.) the explosive range is known to undergo little change. Furthermore, even when these reactants are brought together in a ratio that, in the homogeneous condition, would be outside the flammability envelope, the establishment of homogeneity from pure components necessarily involves at least a temporary passage through the flammability envelope. For these reasons, the explosion risks associated with the direct contacting of hydrogen and oxygen are not easily mitigated.

In the area of directly contacting hydrogen and oxygen, some efforts have also been made to contain the reaction in a liquid phase. For example, U.S. Pat. No. 5,925,588 B1 discloses the use of a catalyst having a modified hydrophobic/hydrophilic support to provide optimum performance in an aqueous liquid phase. Also, U.S. Pat. No. 6,042,804 B1 discloses dispersing minute bubbles of hydrogen and oxygen into a rapidly flowing acidic aqueous liquid medium containing a catalyst. Unfortunately, however, the hydrogen and oxygen reactants are only slightly soluble in the aqueous reaction solvents disclosed in these references.

Other references, namely U.S. Pat. No. 4,336,240 B1 and U.S. Pat. No. 4,347,231 B1 disclose two-phase reaction systems with a homogeneous catalyst dissolved in an organic phase. As mentioned in the former of these two references, homogeneous catalyst systems in general suffer from drawbacks that are a deterrent to their commercial use. The adverse characteristics include poor catalyst stability under reaction conditions, limited catalyst solubility in the reaction medium, and low reaction rates for the production of hydrogen peroxide. In addition, a gaseous $H_2/O_2$ containing environment above the two-phase liquid reaction system maintains the equilibrium concentrations of these reactants dissolved in the liquid phase. Therefore, this gaseous atmosphere above the reaction liquid must necessarily be outside the flammability envelope, thus greatly restricting the range of potential reactant mole ratios in the liquid phase.

There are two types of reactors for making hydrogen peroxide in water. The first is a slurry reactor in which the gas bubbles and catalyst are dispersed in a flowing liquid phase. While this is advantageous for mixing and provides good heat and mass transfer, this method requires a large amount of expensive catalyst, in addition to catalyst recovery and recycle methods. The second reactor is a trickle bed reactor in which the gas and liquid flow over a packed bed of catalyst. The main drawback to the trickle bed reactor is the gas is a continuous phase and therefore requires a small channel size, and hence small particle size to prevent the hydrogen and oxygen from entering a dangerous regime.

It would be useful to have a device and process for making hydrogen peroxide large quantities, on an as-needed basis, without the need of extra chemicals for an environmental safer method, and without generating a waste product stream.

SUMMARY OF THE INVENTION

One method to overcome the drawbacks of the current methods of hydrogen peroxide production is to generate a large amount of hydrogen and oxygen gas mixture in a dispersed phase of small bubbles in a liquid. The present invention provides an apparatus for generating a mixture of hydrogen and oxygen as tiny gas bubbles. The present invention comprises a pair of plates where the first plate has a main channel and a plurality of smaller channels defined in the first plate for carrying a first gas, and the second plate has a main channel and a plurality of smaller channels defined in the second plate for carrying a second gas. The first plate secondary channels have a portion that extends through the plate and have an outlet in fluid communication with the second plate secondary channels. The plates when stacked provide for mixing of the first and second gas streams in the smaller channels of the second plate, and where the gas mixture exits as small bubbles into a liquid stream. This embodiment of the invention provides a design to allow for greater tolerances in manufacturing the apparatus.

In an alternate embodiment, the apparatus comprises a pair of plates where the first plate has a main channel and a plurality of smaller secondary channels defined in the first plate for carrying a first gas. In addition, the first plate has at least one tertiary channel in fluid communication with the secondary channels wherein the tertiary channel extends through the plate and has an outlet on the opposite side of the plate as the primary and secondary channels. The apparatus further comprises a second plate having a main channel and a plurality of smaller secondary channels defined in the second plate for carrying a second gas. The second plate secondary channels are in fluid communication with the outlet for the first plate tertiary channels and provide for mixing of the first gas and second gas in a section of the second plate secondary channels.

Other objects, advantages and applications of the present invention will become apparent to those skilled in the art from the following detailed description.

Additional objects, embodiments and details of this invention can be obtained from the following detailed description of the invention.

BRIEF DESCRIPTION OF THE DRAWINGS

FIG. 3a is schematic of a secondary channel in the first plate of the mixer;
FIG. 3b is a schematic of a secondary channel in the second plate of the mixer;
FIGS. 3c and 3d show potential positions of the secondary channels when the first and second plate are stacked.

DETAILED DESCRIPTION OF THE INVENTION

The present invention is an apparatus for large scale mixing of hydrogen and oxygen in water for reaction to generate hydrogen peroxide ($H_2O_2$). A problem with scale up of hydrogen peroxide production is the generation of quantities that will create large volumes of a mixture of hydrogen and oxygen. This is a potentially dangerous situation. It is therefore desirable to generate a large quantity of mixed hydrogen and oxygen, but in a dispersed phase of small bubbles in water, or other solvent, for the rapid dissolution in the solvent and reaction in the liquid phase to produce hydrogen peroxide. A new design of a mixer suitable for large scale use is presented.

Although this apparatus is described for use with the production of hydrogen peroxide, it is not limited to hydrogen peroxide production but can be used for the mixing of any gases, and it is especially useful for mixing gases that pass through a combustibility envelope. This apparatus is amenable to a convenient scale up for the large scale mixing of gases, and especially providing large scale mixing of hydrogen and oxygen. A new design is presented that enables more flexibility in the manufacturing of the apparatus, and therefore reducing the cost of production of the apparatus.

The invention is a gas sparger with narrow channels and is made by stacking plates in an alternate manner to create an apparatus having at least two gas inlets and a plurality of gas outlets for generating small gas bubbles in a liquid. The apparatus has narrow channels for the gas to create a gas mixture. By using narrow channels, the mixing of gases can be done safely when the mixture is in the combustion envelope. However, the narrow channels on the plates must be aligned to allow for gas to flow through a first set of channels and into a second set of channels to mix the gas flowing from the first set of channels with the gas in the second set of channels. The alignment can present a costly setup and manufacturing process to produce the tight tolerances needed. This invention presents a design for producing the gas sparger that allows for greater tolerance variances in the manufacture of the plates and during the assembly of the apparatus.

Figure 1:
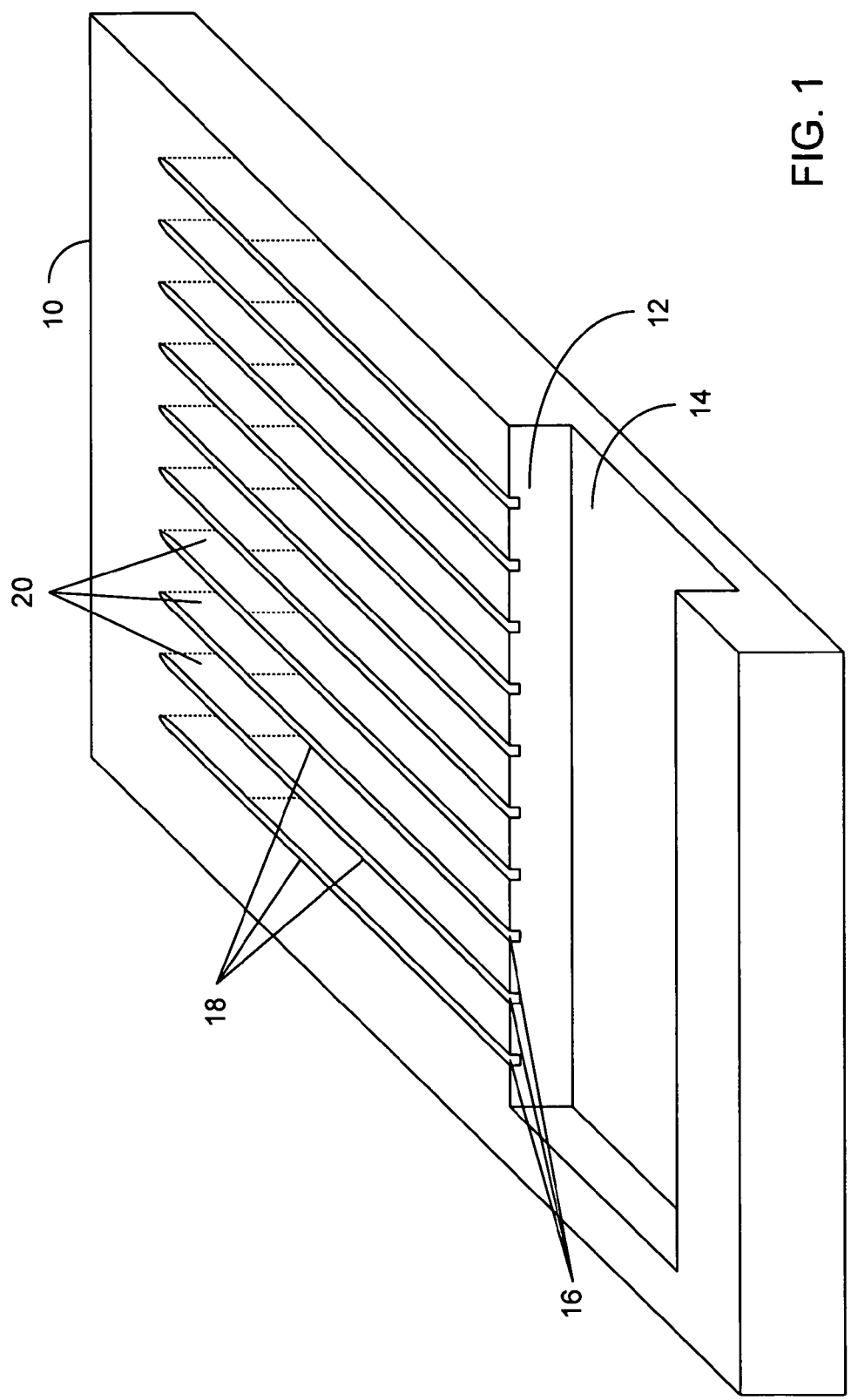
FIG. 1 is a design of a first plate for the mixer.

The apparatus for mixing gases includes at least two plates, a first plate and a second plate. Each plate has a first side and a second side, and has a series of channels defined in the plate. The first plate 10, as shown in FIG. 1, includes a main channel 12 defined in the first side of the plate 10 and has an inlet 14 for receiving a first gas, and a plurality of outlets 16. The first plate 10 also includes a plurality of secondary channels 18, with each secondary channel 18 having an inlet in fluid communication with a main channel outlet 16 and an outlet 20. The secondary channels 18 are defined in the first side of the first plate and have outlets 20 extending through to the second side of the first plate 10. The outlets 20 of the secondary channels 18 have an elongated appearance on the second side of the first plate 10. The outlets 20 are preferably elongated to have a length at least three times greater than the channel width producing outlets with aspect ratios of at least three, although smaller aspect ratios will work for designs with a dense concentration of secondary channels. The aspect ratio of the channel outlets is the ratio of the length, or major axis, of the outlet cross-section to the width, or minor axis, of the outlet cross-section.

Figure 2:
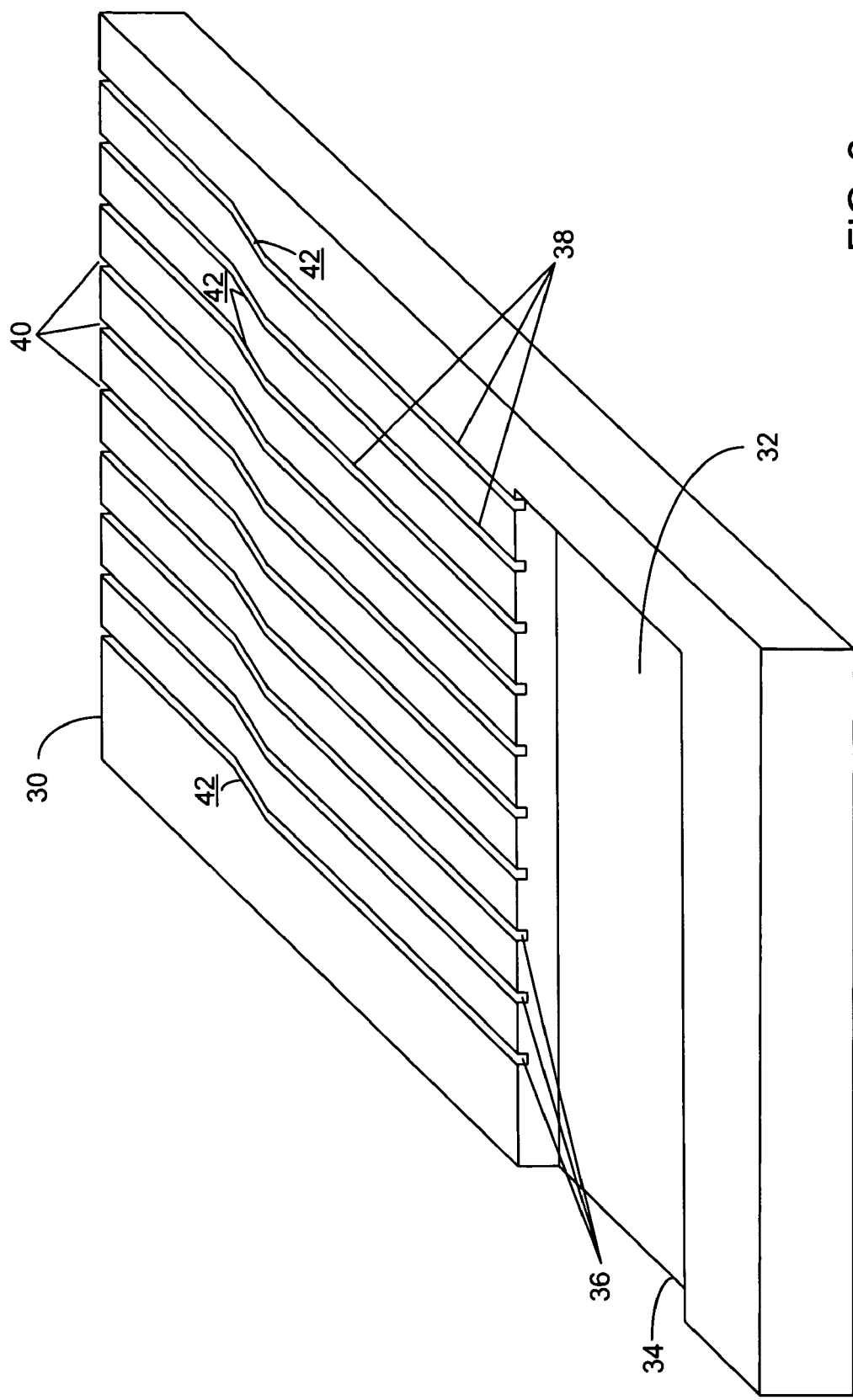
FIG. 2 is a design of a second plate for the mixer.

The second plate 30, as shown in FIG. 2, of the apparatus includes a main channel 32 defined in the first side of the second plate having an inlet 34 for receiving a second gas, and a plurality of outlets 36. The second plate 30 also includes a plurality of secondary channels 38, with each secondary channel 38 having an inlet in fluid communication with a main channel outlet 36 and an outlet 40. The secondary channel outlets 40 are located along one edge of the plate 30. The secondary channels 38 of the second plate 30 have, in general, three sections. A first section beginning at the main channel outlets 36, where the first section extends to a distance about where the outlet 20 from the secondary channels 18 of the first plate 10 are when the first 10 and second 30 plates are stacked. A second section extends from the end of the first section, at an angle relative to a line continuing from the first section between about 1 degree and about 89 degrees. A third section extends from the end of the second section to the secondary channel outlets 40 and in a direction generally parallel to the first section.

The first and second plates 10, 30 when stacked position a portion of the first plate secondary channel outlets 20 in fluid communication with the second plate secondary channels 38. This provides a section of the second plate secondary channels 38 as a mixing region for the first gas and second gas. The plates 10, 30, when stacked, are positioned such that a portion of the secondary channels 38 of the second plate 30 is oriented to be non-parallel to the elongated outlets 20 of first plate secondary channels 18.

A first embodiment of this design entails plates that have channels in a generally rectangular configuration with the channels in the second plate 30 having secondary channels 38 with a section of the channel 42 configured at an angle between 1 degree and 89 degrees with respect to the general direction of the channel 38. Preferably the second section of the channel 42 is configured at an angle between 30 degrees and 60 degrees. The outlets 20 from the secondary channels 18 of the first plate 10 are elongated such that a portion of the outlet 20 overlaps with the section 42 of the second plate secondary channel 38. An individual channel 18 and outlet 20 of the first plate is shown in FIG. 3a, and example of a possible secondary channel 38 in the second plate 30 is shown in FIG. 3b. With this design, when the plates 10, 30 are overlaid, the positioning allows for a greater variance, and two cases are shown for slightly misaligned plates in FIGS. 3c and 3d.

In the present embodiment, the main channels 12, 32 are sized to a width of approximately 50 mm and a depth of approximately 0.5 mm, providing a cross sectional area of 25 mm$^2$. The smaller channels 18, 38 are sized to a width of approximately 0.2 mm and a depth of approximately 0.2 mm, providing a cross sectional area of 0.04 mm$^2$. A good distribution of the gas from the main channels to the smaller channels is achieved by maintaining a ratio of the cross sectional area of the main channel to the sum of cross sectional areas of the smaller channels to be at least 3. In the present embodiment, the current channel sizes allow for about 208 smaller channels to each main channel. The use of small channel dimensions for the smaller channels provides lamellar mixing of the gases and has been shown to be a safe and effective way of mixing hydrogen and oxygen without combustion.

While the specific design of the smaller channels 18, 38 for this embodiment have an effective diameter of about 200 micrometers (0.2 mm), the channel shape and design of the smaller channels 18, 38 are only constrained based upon the composition of the gases to be mixed by the sparger. In the instant case of the mixing of hydrogen and oxygen, the smaller channels 18, 38 have an effective diameter of less than about 300 micrometers (0.3 mm) and preferably less than about 200 micrometers (0.2 mm).

While the design of this invention is for use of mixing hydrogen and oxygen for the production of hydrogen peroxide, the invention is not limited to these gases, but to the contrary, any lamellar mixing of gases may be performed with this invention.

A second embodiment of this invention is that the secondary channels 18, 38 of the plates 10, 30 have a generally rectangular configuration, with the major axis of the outlets 20 of the first plate secondary channels 18 formed at an angle between 1 degree and 89 degrees with respect to the general direction of the secondary channels 18 such that at least a portion of the outlets 20 will overlap at least a portion of the secondary channels 38 of the second plate 30. The angle chosen will depend on the density of secondary channels 18, 38 and the aspect ratio of the outlets 20.

A third embodiment of this invention is that the secondary channels of the first plate have a generally rectangular configuration and the secondary channels of the second plate are oriented at an angle between 1 degree and 89 degrees relative to the first plate when the plates are stacked. The angle chosen for the relationship between the secondary channels of the first plate and second plate depends on, but is not limited to, the density of secondary channels 18, 38, the aspect ratio of the first plates secondary channel outlets 20, and the angle of the outlets 20 major axis relative to the direction of the secondary channels. This relative orientation can be achieved by forming the secondary channels in the second plate at the desired angle, or by rotating the second plate during the assembly of the apparatus when the plates are stacked. In an alternative, the secondary channels of the second plate have a generally rectangular configuration with the secondary channels of the first plate oriented at an angle between 1 degree and 89 degrees relative to the second plate.

The apparatus when assembled forms a device with at least one inlet for a first gas, at least one inlet for a second gas, and a plurality of outlets for a mixture of the first and second gases.

In an alternate embodiment, the outlets from the first plate secondary channels can be oriented to be non-parallel to the second plate secondary channels. The elongated shape of the outlets will provide for a greater range of positions of the first plate relative to the second plate with at least a portion of the outlets of the first plate secondary channels in fluid communication with the second plate secondary channels. This also includes having the outlets from the first plate secondary channels being oriented non-parallel to the first plate secondary channels.

There can be a plurality of first and second plates stacked in an alternating sequence of first plates and second plates. The plates are bonded together such that the channels formed in the plates are enclosed channels. Plates having channels in an exterior face are covered with a solid plate to form enclosed channels for that plate. Additionally, the apparatus can have additional plates with channels for carrying liquids, or for carrying additional gases to be mixed.

The requirement for the design is to allow for more flexible tolerances in the manufacture of each plate, such that when the plates are assembled the outlets of the secondary channels of the first plate are in fluid communication with the secondary channels of the second plate. This allows for a savings and reduced waste in the manufacture of each plate and the assembly of a stack of plates. To that end, a fourth embodiment of the apparatus includes a long transverse channel that encompasses a plurality of the outlets of the secondary channels in the first plate 10. This embodiment comprises a first plate 10 that has a main channel 12 and a plurality of secondary channels 18, similar to the embodiments described above. The secondary channels 18 have inlets in fluid communication with the main channel 12. This embodiment further comprises at least one tertiary channel 50. The tertiary channel 50 has at least one inlet 52 in fluid communication with the secondary channel outlets 20. The tertiary channels 50 extend through the plate 10 to the second side and have an elongated outlet 54, such that when the first plate 10 is stacked on top of the second plate 30, the outlet 54 is in fluid communication with a plurality of second plate secondary channels 38.

Figure 4:
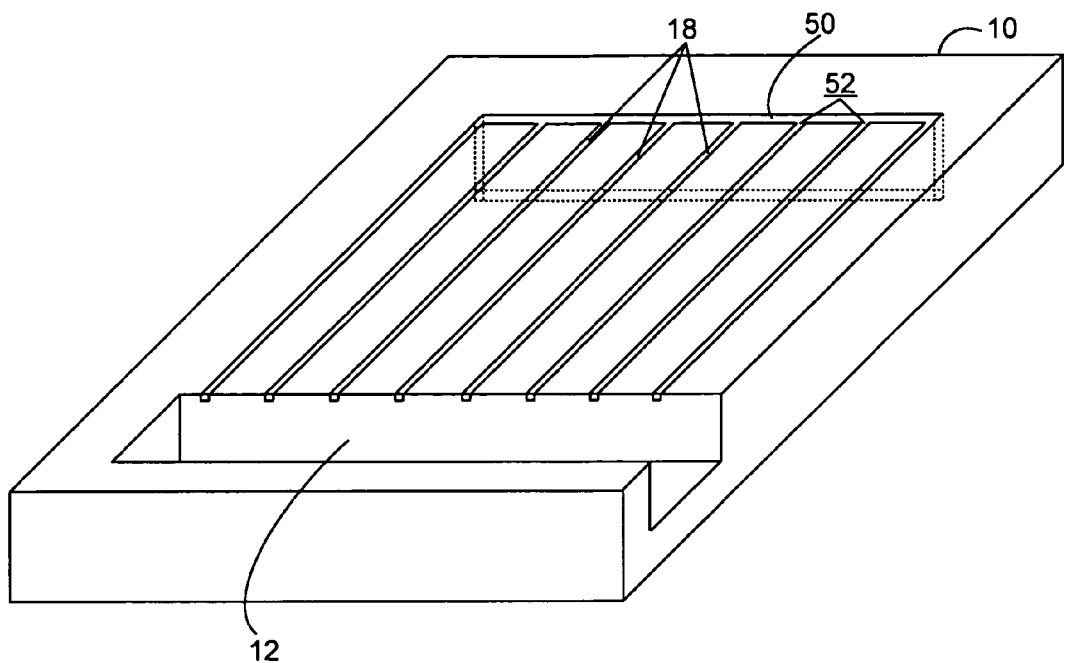
FIG. 4 is a design of a fourth embodiment of the first plate for the mixer.
Figure 5:
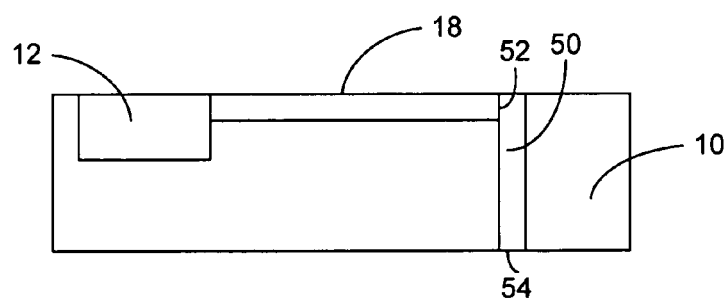
FIG. 5 is a cross-sectional view of the fourth embodiment of the first plate.

In a specific example of this embodiment, as shown in FIG. 4, the first plate 10 has one tertiary channel 50. The tertiary channel 50 has a plurality of inlets that are in fluid communication with the secondary channel outlets 20. The tertiary channel 50 is oriented substantially perpendicular to the secondary channels 18 and intersects all of the secondary channels 18 at the secondary channel outlets 20. While the tertiary channel 50 is oriented perpendicular to the secondary channels 18, it is not required to be perpendicular, only that the tertiary channel 50 intersects one or more secondary channels 20, and that orientation is only limited by design considerations. The tertiary channel 50 extends through the plate 10, as shown in FIG. 5, such that a gas can flow into the main channel 12, distribute to the secondary channels 18, enter the tertiary channel 50 and exit the tertiary channel outlet 50 on the opposing, or second, side of the plate 10. The gas exiting the tertiary channel outlets 54 will enter the secondary channels 38 of the second plate 20 where the gas will mix with a gas in the second plate secondary channels 38. The effective width of the tertiary channel is less than about 300 micrometers (0.3 mm) and preferably less than about 200 micrometers (0.2 mm).

In this embodiment, the second plate 30 can be designed as described above, or the second plate 30 can be designed as in copending application Ser. No. 10/418,589, filed Apr. 17, 2003. The flexibility of the design of the first plate 10 in this embodiment allows for a greater variation in designs of the second plate 20.

While the invention has been describe with what are presently considered the preferred embodiments, it is to be understood that the invention is not limited to the disclosed embodiments, but is intended to cover various modifications and equivalent arrangements included within the scope of the claims.

What is claimed is:

1. An apparatus for mixing at least two gases comprising:
at least one first plate having a first side and a second side, wherein the first plate has a first plate main channel defined in the first side and the first plate main channel has an inlet and a plurality of outlets, and a plurality of first plate secondary channels defined in the first side wherein each first plate secondary channel has an inlet in fluid communication with a corresponding first plate main channel outlet, and a first plate secondary channel outlet wherein the secondary channel outlet is elongated and extends through the plate to the second side; and
at least one second plate having a first side and a second side, wherein the second plate has a second plate main channel defined in the first side and the second plate main channel has an inlet and a plurality of outlets, and a plurality of second plate secondary channels defined in the first side wherein each second plate secondary channel has an inlet in fluid communication with a corresponding second plate main channel outlet, and a second plate secondary channel outlet, and the secondary channel has a section that is oriented to be non-parallel to the first plate secondary channels when the first plate is stacked on the second plate;
wherein at least a portion of each first plate secondary channel outlet is in fluid communication with a second plate secondary channel, with a portion of the second plate secondary channel forming a mixing section, and where the first and second plates are stacked in an alternating sequence with the first plate second side in contact with the second plate first side, and held together to form a gas sparger having a first gas inlet, a second gas inlet, and a plurality of mixed gas outlets.

2. The apparatus of claim 1 wherein the first plate secondary channel outlets are oriented at an angle between about 1 degree and about 89 degrees relative to the orientation of the first plate secondary channels.

3. The apparatus of claim 1 wherein the first plate has secondary channels having a rectangular configuration, the secondary channels extend a predetermined distance in the first plate, and the secondary channel outlets are elongated in a direction generally parallel with the secondary channels, and wherein the second plate has secondary channels defined in three sections, a first section having a generally parallel configuration with the first plate secondary channels and an outlet extending a distance less than or equal to the predetermined distance for the first plate secondary channels, a second section extending from the first section outlet and at an angle between about 1 degree and about 89 degrees to an outlet, and a third section extending from the second section outlet in a direction generally parallel to the first section.

4. The apparatus of claim 3 wherein the angle of the second section is between about 30 degrees and about 60 degrees.

5. The apparatus of claim 1 wherein the second plate secondary channels are oriented at an angle between about 1 degree and about 60 degrees relative to the first plate secondary channels when the first plate and second plate are stacked.

6. The apparatus of claim 1 wherein the secondary channels have an effective diameter of less than about 300 micrometers.

7. The apparatus of claim 1 wherein the mixing section of the second plate secondary channels have an effective diameter of less than 300 micrometers.

8. The apparatus of claim 7 wherein the mixing section of the second plate secondary channels have an effective diameter of less than 200 micrometers.

* * * * *